B. CHURCHILL.
Weighing Apparatus.

No. 49,377.

Patented Aug. 15, 1865.

Fig. 4. Sectional View

WITNESSES
Frederick Curtis
H. D. Hall Jr.

INVENTOR
Benjamin Churchill
by his attorney
R. H. Eddy

UNITED STATES PATENT OFFICE.

BENJAMIN CHURCHILL, OF WAREHAM, MASSACHUSETTS.

IMPROVEMENT IN WEIGHING APPARATUS.

Specification forming part of Letters Patent No. 49,377, dated August 15, 1865.

*To all whom it may concern:*

Be it known that I, BENJAMIN CHURCHILL, of Wareham, in the county of Plymouth and State of Massachusetts, have invented an Improved Weighing Apparatus; and I do hereby declare the same to be fully described in the following specification and represented in the accompanying drawings, of which—

Figure 3:
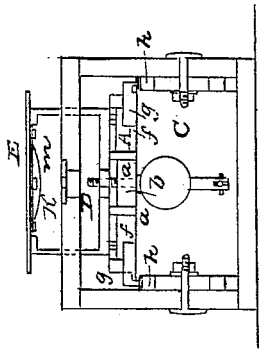
Figure 3:
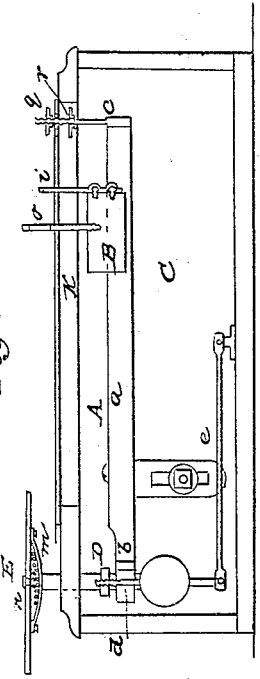
Figure 1:
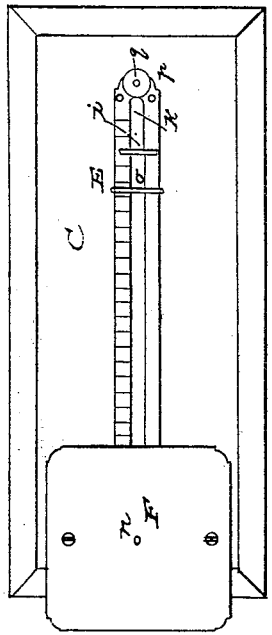
Figure 2:
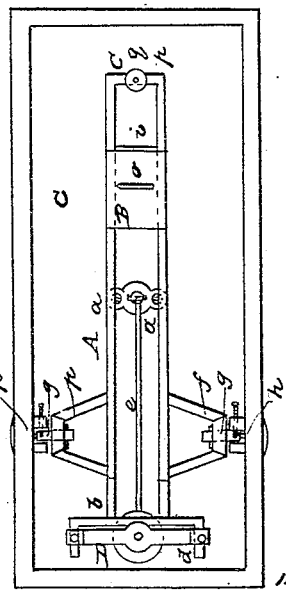

Figure 1 is a top view of it. Fig. 2 is a top view of its movable weight and its beam and the supports thereof. Fig. 3 is a longitudinal section of the whole apparatus. Fig. 4 is a transverse section of it, the plane of section being taken through the supports of the beam.

The object of my invention is to enable the balancing-weight to be moved across the axis of motion of the weighing-lever in order to bring the center of gravity of the weight vertically over the said axis of motion, when the weighing-lever and the platform or scale may be balanced without having any weight on the said platform.

In carrying out my invention I construct the beam A with two arms, $a$ $a$, arranged parallel to one another, and connected at their ends to cross-bars $b$ $c$. The bar $b$ has projections $d$ $d$, which serve to sustain the pivots of the scale-pan supporter D, which is applied to the beam and guided by a radial rod, $e$, in the ordinary way.

The arms $f f$, carrying the knife-edge bearings $g$ $g$ of the lever, extend in opposite directions from it, the bearings resting on supports $h$ $h$.

The weight is represented at B, which is a block of metal placed on and extending down between the two arms $a$ $a$, the whole being arranged within a box, C, and so that an indicator, $i$, from the weight may extend through and out of a slot, $k$, made centrally over the lever and through the top of the box, and having a graduated scale, E, arranged with reference to it in manner as exhibited in the drawings. The platform-supporter D also projects through and above the top of the box or suitable openings made therein, and has the scale pan or platform E fixed to its top. Furthermore, the scale pan or platform is constructed with a shot vessel or chamber, $m$, extending underneath and from it, and provided with a hole made through the platform, a screw, $n$, being screwed into such hole. The said vessel or chamber $m$ is for the reception of shot or other matter used for balancing the beam and scale pan or platform.

A handle, $g$, extends upward from the weight and through and above the slot on the top of the box. By taking hold of this handle the weight may be moved along longitudinally on the beam or lever. A rod, $p$, carrying two stops, $q$ $r$, extends from the lever and through the top of the box, one of the stops being above and the other below the said top. These stops are for limiting the vibratory motions of the lever, which they do by contact with the top of the box.

From the above it will be seen that the weight B can be moved across the axis of motion of the lever. This enables quite a heavy weight, B, to be used to indicate on the graduated scale very small as well as large variations of weight on the platform. Thus my weighing apparatus may be used for weighing letters as well as heavy packages for the mails.

I do not claim the employment of a weight in such manner as to be moved across the axis of motion of the beam; but

What I claim in the above-described weighing apparatus is—

1. The construction of its beam and movable weight and the arrangement of knife-edge bearings relatively to the beam, substantially in manner as explained, so as to enable the weight to be moved across the axis of motion of the beam, as and for the purposes specified.

2. The arrangement of the shot-receiving chamber or vessel with the platform, as described.

BENJAMIN CHURCHILL.

Witnesses:
H. E. FISHER,
F. P. HALE, Jr.